Feb. 14, 1967 N. W. PARKER 3,304,375

FM STEREO MULTIPLEX RECEIVER FOR AUTOMATICALLY SWITCHING BETWEEN STEREOPHONIC AND MONAURAL OPERATION

Original Filed Nov. 6, 1962

INVENTOR.
NORMAN W. PARKER

BY Mueller & Aichele

ATTYS.

3,304,375
FM STEREO MULTIPLEX RECEIVER FOR AUTOMATICALLY SWITCHING BETWEEN STEREOPHONIC AND MONAURAL OPERATION

Norman W. Parker, Wheaton, Ill., assignor to Motorola, Inc., Franklin Park, Ill., a corporation of Illinois Continuation of application Ser. No. 235,738, Nov. 6, 1962. This application Mar. 25, 1965, Ser. No. 445,844
10 Claims. (Cl. 179—15)

This invention relates to stereophonic detecting apparatus and more particularly to such apparatus which is automatically responsive to the presence of a stereophonic broadcast signal. This application is a continuation of application Serial No. 235,738, filed November 6, 1962.

The present FM stereo system utilizes a broadcast signal which is a composite of three components, namely frequency modulation signal components extending from 30 cycles to 15 kilocycles and representing the sum of the left and right stereophonic signals, a double sideband, suppressed carrier amplitude modulated signal which is the difference of the left and right information in a band extending from 23 to 53 kc., and a low amplitude 19 kilocycle pilot carrier as a reference for producing a demodulating wave at 38 kilocycles for the suppressed carrier sideband information. The sum of the right and left audio frequency signals represents monaural information and is frequency modulated on the main carrier so that the entire system is compatible and may be used with receivers which do not have the necessary circuitry to produce the stereophonic information in response to the pilot carrier and the suppressed subcarrier modulation information.

In utilizing such a stereophonic signal the receiver demodulates the signal representing the sum of the right and left audio frequency signals and further separates the 19 kilocycle pilot carrier for controlling a circuit to locally produce the synchronized 38 kilocycle demodulating wave. This demodulating wave can then be combined with the suppressed carrier modulation components representing the difference between the right and left signals so that detection of this amplitude modulation difference signal and combination thereof with the sum signal will provide the separate right and left audio frequency signals.

Receivers thus have a local oscillator or a frequency doubler which is controlled by the pilot signal to produce a proper demodulating wave at 38 kilocycles. For several reasons, it is desirable to switch on the 38 kilocycle demodulating wave only when a pilot carrier is present and of proper amplitude for satisfactory stereophonic signal reproduction. For example, when a receiver is tuned from one station to another, increased noise will be reproduced if the 38 kilocycle demodulating wave is being generated in the receiver. This is because the relatively high energy content of noise in the band of the suppressed subcarrier (23–53 kilocycles) can modulate the 38 kilocycle demodulating wave to be translated through the receiver. Users of course find such noise undesirable. Furthermore, if a receiver does not positively respond to the presence of a pilot carrier, a relatively weak composite signal may cause the receiver to switch intermittently from stereophonic to monaural operation, again causing annoyance for the listener.

An object of this invention is to automatically condition the receiver for stereophonic or monaural operation depending on the presence of the pilot carrier in proper amplitude.

Another object is to reduce spurious noise production in FM stereophonic receivers and to render such receivers more positive acting in response to stereophonic signals.

In a particular form of the invention the pilot carrier is separated from the composite signal and applied to an oscillator or a frequency doubler for generating the demodulating wave. Specifically, the 19 kilocycle pilot signal may be selected and amplified for control of a 38 kilocycle frequency doubler. The doubler has an electron valve normally biased to cutoff so that the valve only conducts when a pilot responsive control voltage of sufficient amplitude is applied thereto. The most effective way to control the electron valve is by a detector circuit for the pilot signal connected into the translating network which applies the pilot carrier to the frequency doubler. Such a detector can thus produce a positive bias for the grid of a voltage doubler tube in order to overcome a cutoff cathode bias for that tube. In this way decerased amplitude of, or absence of, the pilot signal will cause the doubler tube to return to a cutoff condition and undesirable production of the 38 kilocycle demodulating wave does not take place. When the demodulating wave is produced in response to the pilot signal, the system does, in accordance with known techniques, combine the demodulating wave with the modulation components of the difference of the right and left signals for detection of them and combination of them with the sum of the right and left signals to produce separate right and left audio frequency signals.

Figure 1:
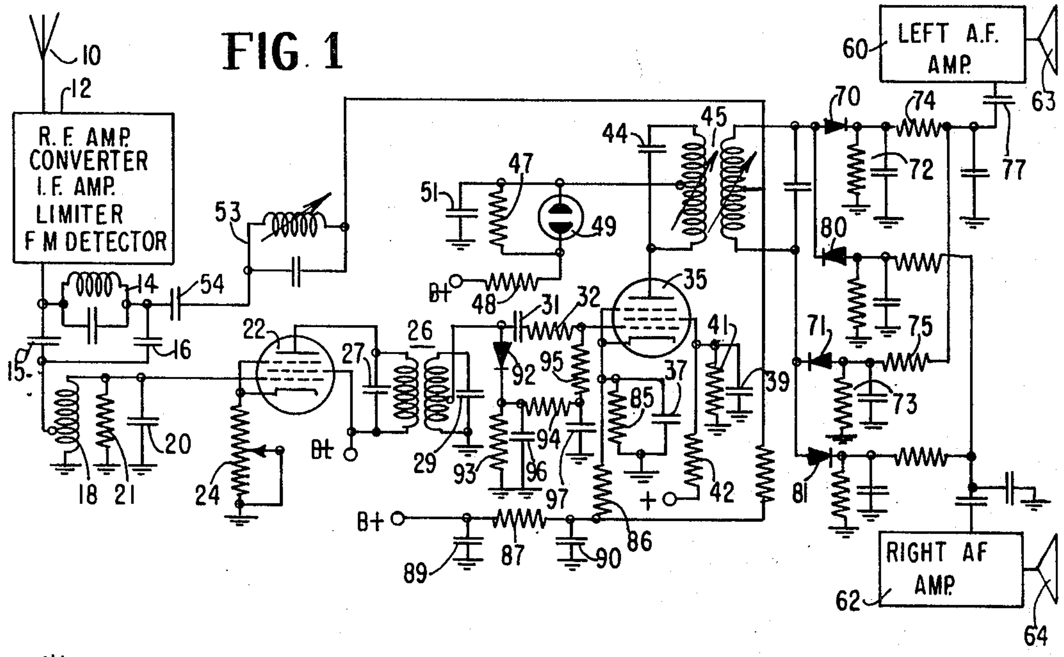
FIG. 1 is a schematic diagram showing one form of the invention.

In the receiver of FIG. 1 the frequency modulated carrier wave containing the sum signal of the right and left audio signals, the difference of the right and left audio signal amplitude modulated on a suppressed carrier wave, and a pilot signal having a frequency one-half that of the suppressed carrier frequency is received by the antenna 10 and applied to the circuit 12. Circuit 12 represents the usual RF amplifier converter, IF amplifier, limited, and frequency modulation detector which may be of known design. Accordingly, the output of the circuit 12 would consist of an audio frequency signal representing the right and left signals which is monaural signal information. The output would also include the 19 kilocycle pilot carrier and the suppressed carrier difference signal components. The pilot carrier is derived across the impedance of the parallel tuned trap 14 and applied through capacitors 15 and 16 to the tap of a tuning coil 18. Coil 18 cooperates with the capacitor 20 connected in parallel therewith and is tuned to the 19 kilocycle pilot carrier. A resistor 21 is shunted across this tuned circuit for band shaping purposes.

Signals developed across the tuned circuits 18, 20 are applied to the grid of the pentode tube 22 which functions as a 19 kilocycle amplifier. A variable resistor 24 is connected between the cathode of tube 22 and ground for bias purposes. The screen grid of tube 22 is connected to B+ and the anode is connected through the primary winding of transformer 26 to B+. This primary winding is shunted by a capacitor 27 so that it is tuned to 19 kilocycles. The secondary winding of transformer 26 is also shunted by a capacitor 29 so that it may be tuned to the pilot carrier frequency and the tap of this primary winding is connected through capacitor 31 and resistor 32 to the control grid of pentode tube 35. The Tube 35 and its associated circuitry form a frequency doubler to produce a 38 kilocycle demodulating wave which is phased locked to the pilot carrier. The cathode of tube 35 is bypassed to ground by means of capacitor 37 and the screen grid thereof is also bypassed by means of capacitor 39. The screen grid of tube 35 is established at a positive potential by the connection thereof to an intermediate point of the voltage divider comprising resistors 41 and 42.

The anode of tube 35 is connected to one side of a parallel tuned circuit comprising capacitor 44 and the primary winding of transformer 45. The tuned circuit including this primary winding and capacitor 44 are tuned to 38 kc. A tap point of the primary winding of transformer 45 is connected through resistors 47 and 48 to B+ for energization of the anode of tube 35. A neon bulb 49 is connected across resistor 47 and a capacitor 51 is connected from the tap point of the transformer primary winding to ground. Accordingly, when tube 35 is conducting, a voltage will be established across resistor 47 which is sufficient to ionize the neon bulb 49 and this may be used as a visual indication to show the user of the receiver that the 38 kilocycle circuit is operating and that a stereophonic signal is being received. Further details of the particular circuitry in the doubler system will be explained subsequently to make clear the exact means which causes tube 35 to conduct only in the presence of a proper pilot signal.

Continuing with the description of the general operation of the system, the secondary winding of transformer 45, being center tapped, will produce a 38 kc. demodulating wave having opposite phases at each end thereof. The center tap of secondary winding is connected through the parallel resonant trap 53 and the blocking capacitor 54, as well as the parallel resonant trap 14, to the output of the circuit 12. Accordingly, the sum of the right and left audio frequency signals, as well as the suppressed carrier modulation components of the difference of the right and left signal will be applied from the circuit 12 to the center tap of the secondary winding of transformer 45. The traps 14 and 53 are tuned to 67 kilocycles in order to suppress the so-called "subsidiary communications authorization" signal, also known as SCA or store cast signals which some stations may transmit.

The secondary winding of transformer 45 is connected to a network which will demodulate the difference signal and combine that with an audio frequency sum signal to produce a left audio frequency signal for amplification by the amplifier 60 and the right audio frequency signal for amplification by the amplifier 62. Amplifiers 60 and 62 are respectively connected to loudspeakers 63 and 64 for reproduction of the separate signals so that a stereophonic effect may be produced for a listener.

The operation of the envelop or peak demodulating network is known, but will be described here in general terms for the sake of completness. Each stereo detector channel includes a pair of diodes connected in pushpull. The left channel has diodes 70 and 71 which are oppositely polarized and fed with opposite phases of the 38 kilocycle demodulating wave from transformer 45. The cathode of diode 70 is connected through an RC network 72 to the reference point and the anode of diode 71 is connected through the RC network 73 to the reference point. The cathode of the diode 70 is connected through the resistor 74 and the resistor 75 to the anode of diode 71. In this manner the detected envelope of the 38 kilocycle demodulating wave is balanced out at the junction of resistors 74 and 75. However, at this point the combination of the demodulated difference signal and the audio frequency sum signal appears so that they are combined to produce only the left audio frequency signal which is applied through capacitor 77 to the amplifier 60. What occurs is that diodes 70 and 71 both conduct on one-half of the cycle of the demodulating wave, the half of this cycle associated with the left signal so that by the envelope detection of this portion of the demodulating wave only the left audio frequency components will be selected from the composite signal applied to the detector network.

As may be seen, the diodes 80 and 81 are connected in a corresponding manner to the transformer 45 and to the amplifier 62 so that the opposite portion of the demodulating wave will cause conduction thereof and detection of the envelope of this wave will result in the combination of the sum and difference signals causing the production of only the right audio frequency signal which is applied to amplifier 62.

The particular operation of the circuit which produces the 38 kilocycle demodulating wave will now be discussed. As has been previously indicated, when a receiver is tuned between stations and the circuit associated with tube 35 is still producing a 38 kilocycle signal, the relatively high energy noise in the 23–53 kilocycle range will be demodulated to cause increased noise output of the receiver. Or, it is also possible that a weak signal input will not permit positive response of the circuit for producing the 38 kilocycle demodulating wave. In order to overcome these deficiencies the cathode of tube 35 is connected to the junction of resistors 85 and 86. Resistor 86 is series connected through resistor 87 to B+. Resistor 85 is connected to ground so that a voltage divider is formed and the cathode of tube 35 is biased to a normally cutoff condition. Each side of resistor 87 is bypassed through capacitors 89 and 90 for filtering purposes.

A diode rectifier 92 has the anode thereof connected to the tap of the secondary winding of transformer 26 and the cathode connected through resistor 93 to ground. The junction of diode 92 and resistor 93 is D.C. connected through resistors 94 and 95 to the control grid of tube 35. A capacitor 96 is connected across resistor 93, and a capacitor 97 is connected from the junction of resistors 94, 95 to ground.

As has been stated, the 19 kilocycle pilot signal is applied through capacitor 31 and isolating resistor 32 to the control grid of tube 35. The same pilot signal is also applied across rectifier 92 and resistor 93 so that detection thereof will take place. Resistor 93 and capacitor 96 form the load circuit for the detector and a positive D.C. voltage is thus developed at the cathode of diode 92. This D.C. voltage is responsive to the 19 kc. pilot carrier and is applied through the long time constant network 94, 97 and resistor 95 to the grid of tube 35. The positive voltage is of sufficient magnitude to overcome the cathode bias of tube 35 and permit tube 35 to conduct.

It should be apparent that the pilot detector circuit described will cause positive action of the circuit producing the demodulating 38 kilocycle wave so that if a weak signal is being received, or if the receiver is being tuned between stations, tube 35 will be cut off. Slow response of the doubler to the detector is desirable to insure stereo functioning only when a pilot signal is present for a predetermined period, such as two or three seconds, and this is set by the RC time of resistor 94 and capacitor 97. It has also been described that neon bulb 49 will be lighted when tube 35 is conducting so that a proper indication may be made to a user of the receiver that the sereo signal is present and appropriate adjustments of audio balance and the like can be made in amplifiers 60 and 62.

In a system of practical construction the values of component parts were as follows:

| | | |
|---|---|---|
| Capacitor **31** | microfarads | .001 |
| Resistor **32** | ohms | 100,000 |
| Tube **35** | | 6AU6 |
| Resistor **93** | ohms | 100,000 |
| Resistor **94** | do | 220,000 |
| Resistor **95** | do | 100,000 |
| Capacitor **96** | microfarads | .005 |
| Capacitor **97** | do | 2 |

Figure 2:
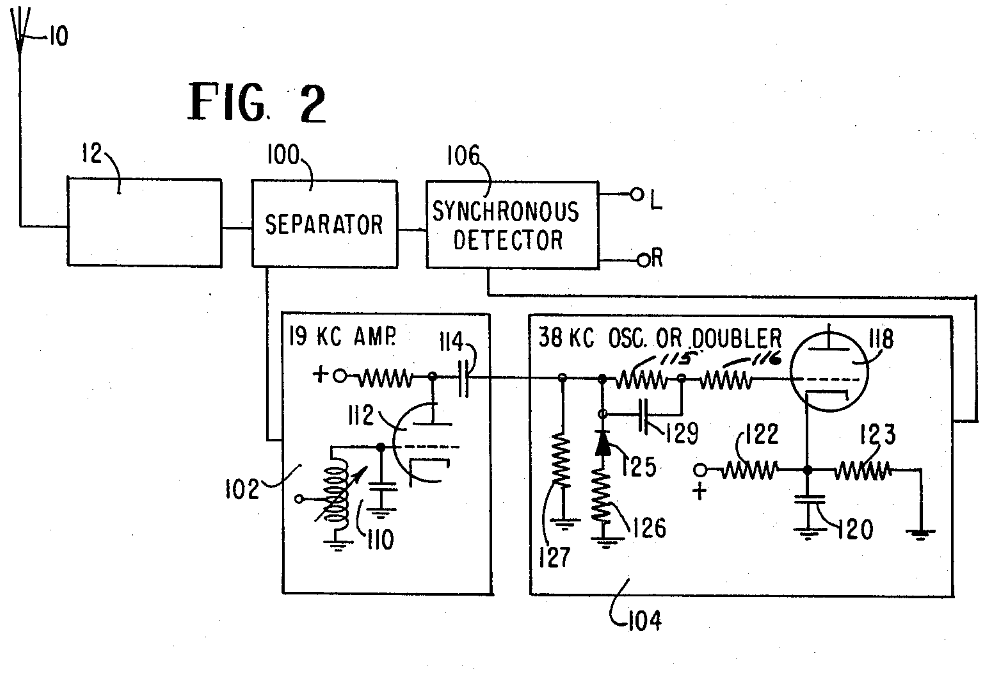
FIG. 2 is a diagram of a modified form of the invention.

In FIG. 2 there is shown a corresponding system in which a slightly different pilot detector system is shown. In this system the output of the circuit 12 is applied to a separator 100 which will furnish the 19 kilocycle pilot signal to the amplifier 102. Amplifier 102 applies the pilot carried to the 38 kilocycle oscillator or doubler 104 to produce a demodulating wave applied to the synchronous detector 106. The separator circuit 100 is also connected to the synchronous detector 106 to couple the sum of the right and left audio signals and the modulation components of the difference of the right and left stereo signals to the detector 106. The detector 106 may be of a type known in the art and could be of the type described in connection with FIG. 1.

Directing attention to the circuit portions significant for present purposes, it may be noted that a tuned circuit 110 is used to select the 19 kilocycle pilot carrier and apply this to the amplifier tube 112. The anode of tube 112 is connected through a blocking capacitor 114 and the resistors 115 and 116 to the control grid of the tube 118. It is contemplated that tube 118 would be connected to other associated circuitry to function as an oscillator or a frequency doubler.

The cathode of tube 118 is bypassed to ground through capacitor 120. The cathode is also biased at a positive voltage by means of the connection thereof to the voltage divider 122, 123. A diode rectifier 125 has its cathode connected to the junction of capacitor 114 and resistor 115. The anode of the diode is connected to ground through resistor 126 and a resistor 127 is connected across the series combination of diode 125 and resistor 126. Capacitor 129 is connected across resistor 115.

The operation of the system of FIG. 2 includes the coupling of 19 kilocycle pilot carrier through capacitor 114, resistors 115 and 116 to the control grid of tube 118. The pilot carrier will also be rectified by the diode 125 to charge capacitor 114 and form a D.C. voltage across resistor 127. This voltage will be positive at the top of this resistor to apply a positive D.C. voltage to the grid of tube 118 when the pilot signal is present. This D.C. control voltage is of sufficient amplitude to overcome the cathode bias of tube 118 and cause conduction thereof and functioning of the circuit for the production of the 38 kilocycle demodulating wave.

Accordingly, the invention provides a stereophonic detecting system which is automatically responsive to the presence or absence of a stereophonic broadcast signal in order to reduce background noise during tuning operation of the receiver. Furthermore, the system may be rendered positively operative only when a signal of proper amplitude is received so that a receiver will produce stereophonic signals automatically without the need for the listener to adjust a switch or other components of his receiver.

What is claimed is:

1. Stereophonic signal demodulating apparatus for deriving right and left audio frequency signals from a received signal representing the sum of the right and left signals and suppressed carried modulation components representing the difference of the right and left signals and a carrier representative signal related to the suppressed carrier, including in combination, circuit means for developing the carrier representative signal for demodulating the modulation components, said circuit means including an electron control device in the path of the carrier representative signal and means to bias said control device to cutoff, means coupled to said control device and responsive to the carrier representative signal for biasing said control device into conduction, said means including a network to delay for a predetermined time the translation of the carrier representative signal upon reception of the received signal, and means for combining the carrier representative signal, the modulation components and the sum signal for producing separate right and left audio frequency signals.

2. Stereophonic signal demodulating apparatus for deriving right and left audio frequency signals from a received signal representing the sum of the right and left signals and suppressed carrier modulation components representing the difference of the right and left signals and a carrier representative signal related to the suppressed carrier, including in combination, circuit means for developing the carrier representative signal for demodulating the modulation components, said circuit means including an electron control device in the path of the carrier representative signal and means to bias said control device to cutoff, detector means coupled to said control device and responsive to the carrier representative signal for biasing said control device into conduction, said detector means including a resistor-capacitor network to delay for a time of the order of two seconds the translation of the carrier representative signal upon reception of the received signal, and means for combining the carrier representative signal, the modulation components and the sum signal for producing separate right and left audio frequency signals.

3. Stereophonic signal demodulating apparatus for deriving right and left audio frequency signals from a sum signal demodulated from a main carrier and representing the sum of the right and left audio frequency signal and stereo subcarrier components of the main carrier comprising a subcarrier and modulation components representing the difference of the right and left signals, including in combination, signal translation means including signal paths for translating the sum signal and the stereo subcarrier components, means connected to said signal translation means for demodulating the subcarrier components and combining the same with the sum signal to produce separate right and left audio frequency signals, a voltage controlled switching device positioned in the path of the stereo subcarrier components and operative to pass and not pass the stereo subcarrier components, and a detector circuit connected to said switching device to operate the same in response to the subcarrier and including a resistor-capacitor delay network with values selected so that the voltage applied to said switching device is below that necessary to operate the same for a predetermined time after the presence of the subcarrier.

4. Stereophonic signal demodulating apparatus for deriving right and left audio frequency signals from a sum signal demodulated from a main carrier and representing the sum of the right and left audio frequency signal and stereo subcarrier components of the main carrier comprising a subcarrier and modulation components representing the difference of the right and left signals, including in combination, signal translation means including signal paths for translating the sum signal and the stereo subcarrier components, means connected to said signal translation means for demodulating the subcarrier components and combining the same with the sum signal to produce separate right and left audio frequency signals, a switching device positioned in the path of the stereo subcarrier components, and control means to operate said switching device in response to the subcarrier and including a delay network with values selected so that said switching device is ineffective to translate the stereo subcarrier components for a predetermined time after the presence of the subcarrier.

5. Stereophonic signal demodulating apparatus for deriving right audio frequency signals and left audio frequency signals and suppressed carrier modulation components representing the difference of the right and left signals and a pilot subcarrier subharmonically related to the suppressed carrier, including in combination, first circuit means for amplifying and selecting the pilot carrier, oscillator means responsive to the pilot carrier to produce a demodulating wave for the modulation components, said oscillator means including an electron valve with a grid and a cathode biased to a cutoff condition, third circuit means connecting said first circuit means to said grid to apply the pilot carrier thereto, a detector network connected to said third circuit means and direct current connected to said grid to produce a positive potential to bias said valve into conduction, said detector network having an RC time constant to delay for a predetermined time the production of the demodulating wave in response to translation of the pilot carrier in said third circuit means, and means for combining the demodulating wave, the difference signal components and the sum signal and producing separate left and right audio frequency signals.

6. Stereophonic signal demodulating apparatus for deriving right audio frequency signals and left audio frequency signals and suppressed 38 kilocycle carrier modulation components representing the difference of the right and left signals and a 19 kilocycle pilot subcarrier related to the suppressed carrier, including in combination, amplifier circuit means for amplifying and selecting the pilot carrier, frequency doubler means responsive to the pilot carrier to produce a demodulating wave for the modulation components, said frequency doubler means including an electron valve with a grid and a cathode biased to a cutoff condition, further circuit means connecting said amplifier circuit means to said grid to apply the pilot carrier thereto, a neon bulb connected to said valve to be energized upon conduction of said valve, a detector network connected to said further circuit means and direct current connected to said grid to produce a positive potential to bias said valve into conduction, said detector network having an RC time constant to delay for a time of the order of two seconds the production of the demodulating wave in response to translation of the pilot carrier in said further circuit means, and means for combining the demodulating wave, the difference signal components and the sum signal and producing separate left and right audio frequency signals.

7. Stereophonic signal demodulating apparatus for deriving right and left audio frequency signals from a sum signal demodulated from a main carrier and representing the sum of the right and left audio frequency signal and stereo subcarrier components of the main carrier comprising a subcarrier and modulation components representing the difference of the right and left signals, including in combination, signal translation means including signal paths for translating the sum signal and the stereo subcarrier components, means connected to said signal translation means for demodulating the subcarrier components and combining the same with the sum signal to produce separate right and left audio frequency signals, a switching device positioned in the path of the subcarrier, and control means to operate said switching device in response to the subcarrier and including a delay network with values selected so that said switching device is ineffective to translate the stereo subcarrier components for a time of the order of two seconds after the presence of the subcarrier.

8. Multiplex signal apparatus operative in a first mode in which the apparatus derives a first signal modulated on a main carrier and a second mode in which said apparatus derives the first signal and a second signal represented by subcarrier modulation components and a subcarrier control wave, including in combination, a utilization device for the derived signals, receiver circuit means coupled to said utilization device and responsive to the first and second signals to operate said utilization device, said circuit means including a first signal path for translating the first signal to the utilization device and a second path including an electron control device for translating at least a portion of the second signal, and a detector circuit included in said receiver circuit means and responsive to the subcarrier wave, said detector circuit being coupled to said control device to develop a control signal and render the same conductive only in the presence of the subcarrier wave, said detector circuit including a resistor-capacitor network to delay for a predetermined time conduction of said control device after the subcarrier wave is present so that said second path is open circuited during operation in the first mode to reduce spurious signal translation therethrough.

9. Multiplex signal apparatus operative in a first mode in which the apparatus derives a first signal modulated on a main carrier and a second mode in which said apparatus derives the first signal and a second signal represented by subcarrier modulation components and a subcarrier control wave, including in combination, a utilization device for the derived signals, receiver circuit means coupled to said utilization device and responsive to the first and second signals to operate said utilization device, said circuit means including a first signal path for translating the first signal to the utilization device and a second signal path including an electron control device for translating at least a portion of the second signal, a bias circuit to cutoff said control device and a detector circuit included in said receiver circuit means and having a tuned circuit and a diode responsive to the subcarrier wave, said detector circuit being coupled to said control device to overcome the cutoff bias of said control device and render the same conductive only in response to the subcarrier wave, said detector circuit including a resistor-capacitor network to delay conduction of said control device for a time of the order of two seconds after the subcarrier wave is present so that said second path is open circuited through cutoff of said control device during operation in the first mode to reduce spurious signal translation therethrough.

10. Stereophonic signal demodulation apparatus for deriving right and left audio frequency signals from a received signal representing the sum of the right and left signals and suppressed carrier modulation components representing the difference of the right and left audio frequency signals and a carrier representative signal related to the suppressed carrier, including in combination, circuit means for developing the carrier representative signal for demodulating the modulation components, said circuit means including a voltage controlled switching device operative to pass and no pass the carrier representative signal, detector means responsive to a component of the received signal to produce a control voltage for said switching device, said detector means including a resistor-capacitor network with values selected to delay for a predetermined time development of the control voltage to operate said switching device thereby reducing the tendency for response of said switching device except upon continued presence of the component of the received signal, and means for combining the carrier representative signal, the modulation components, and the signal representing the sum of the right and left signals for producing the separate right and left audio frequency signals.

References Cited by the Examiner

UNITED STATES PATENTS 3,198,885 8/1965 Limberg ............ 179—15

DAVID G. REDINBAUGH, *Primary Examiner*.

ROBERT L. GRIFFIN, *Examiner*.